Sept. 4, 1945. J. EATON 2,384,372
TIME AND CONDITION RESPONSIVE INTERLOCKING CONROL SYSTEM
Filed July 1, 1943
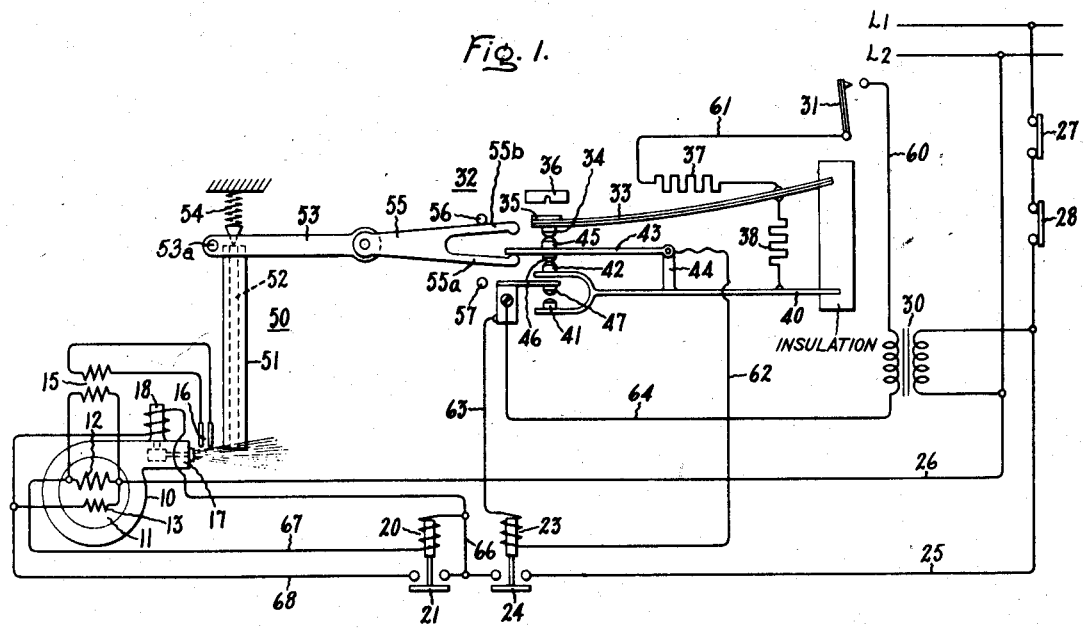
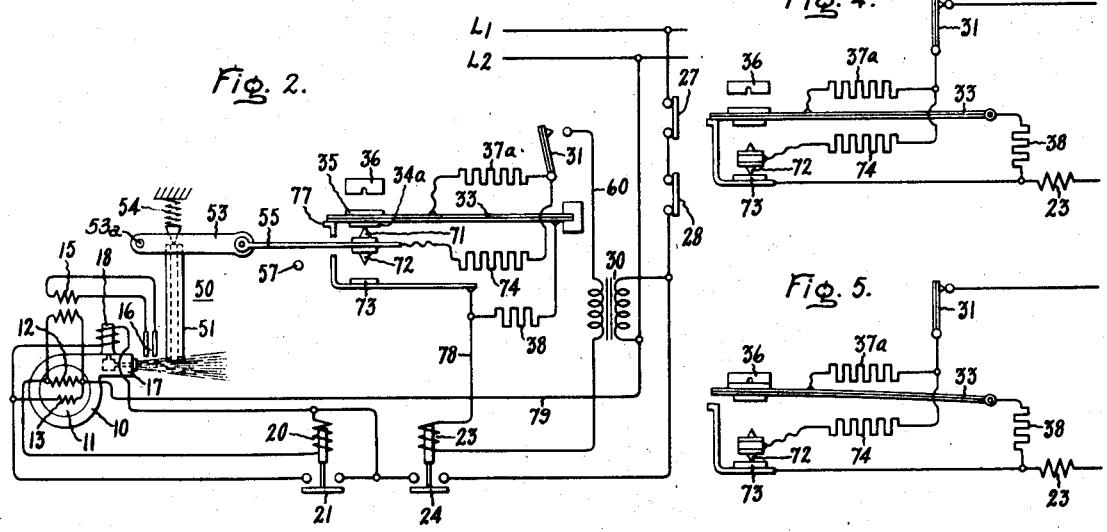
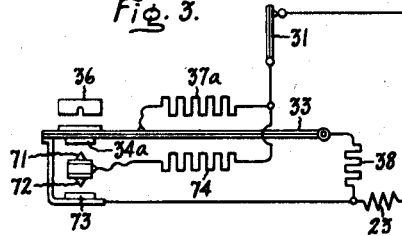
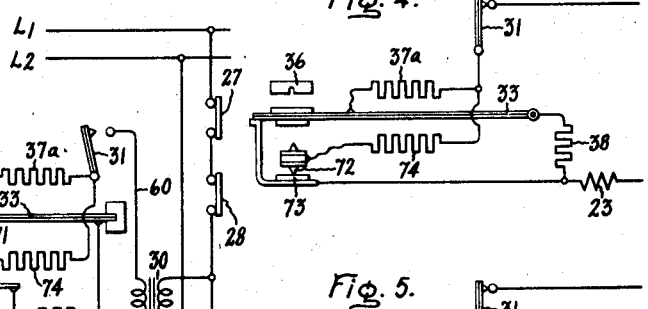
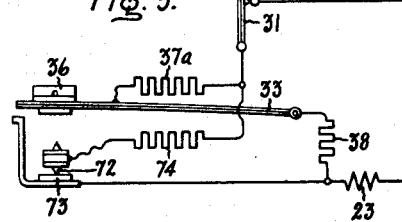
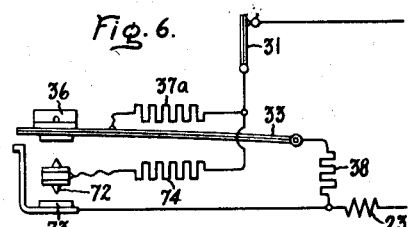
Inventor:
John Eaton,
by Harry E. Dunham
His Attorney Patented Sept. 4, 1945

2,384,372

UNITED STATES PATENT OFFICE 2,384,372

TIME AND CONDITION RESPONSIVE INTER-
LOCKING CONTROL SYSTEM

John Eaton, Schenectady, N. Y., assignor to General Electric Company, a corporation of New York Application July 1, 1943, Serial No. 493,008

14 Claims. (Cl. 175—320)

The invention relates to time and condition responsive interlocking control systems, particularly of the automatic type suitable for controlling electrically operated oil burners or other devices requiring a timed safety lockout under abnormal conditions.

The safety interlocking and automatic condition responsive control requirements of such systems are manifold and vital since proper provisions must be made not only for automatically energizing and deenergizing the electrically operated oil burner or other condition changing device to regulate a predetermined condition such, for example, as room temperature or the like, but also for effecting a timed safety lockout of the automatic master control upon the failure of a prerequisite condition such, for example, as the establishment of combustion or the like, to occur in proper sequence within a limited starting period, while enabling both during and after such period other automatic safety controls to selectively deenergize or prevent reenergization of the device upon the occurrence of both physical and electrical abnormal conditions such, for example, as a failure of combustion after the initial successful establishment thereof, a voltage failure of the electrical supply source, and even electrical or mechanical failures or false operations of the essential time and automatic condition responsive control elements.

My prior Patents 2,085,577, of June 29, 1937, and 2,278,252, of March 31, 1942, disclose and claim certain improvements in safety interlocking control systems of the character indicated, but leave something to be desired in the way of a more simple and yet effective and safe time and condition responsive interlocking control system.

One of the objects of the present invention is to provide an improved form of time and condition responsive interlocking control system wherein a timed condition responsive safety lockout is obtained electrically rather than mechanically.

Another object is to interlock an electro-thermal timing and condition responsive safety circuit lockout with a master circuit control device so that the opening of the circuit controlled by the master control device will reset the electrothermal safety circuit lockout device.

A specific object is to provide an improved combined electro-thermal lockout timing and condition responsive sequence switching mechanism with a current limiting resistor interconnected therewith so as to be capable of controlling the energization of a main control relay in conjunction with a master switch in such a way as to meet the manifold and vital safety interlocking and automatic control requirements outlined above.

Another specific object is to provide an improved form of selective sequence switching mechanism having relatively movable complementary circuit controlling members, one operable directly by an electrically heated thermal timing operating element, and the complementary member operable directly by a condition responsive operating element for cooperating with a master switch to provide a time and condition responsive relay variable energization control of the character indicated.

A still further specific object is to provide an improved form of multiple resistor selective switching mechanism for cooperating with a master control switch in controlling the energization of an electroresponsive control device and having a snap action thermal timing circuit controlling element started into operation under the control of the master switch and a relatively movable selective circuit controlling condition responsive element responsive to a predetermined condition under the control of the electroresponsive device for jointly and selectively controlling the resistor switching operations so as to control the pick-up, the holding, and the lockout energizations of the electroresponsive device independently of the master control switch.

Briefly, in the preferred embodiment of the present invention, a main electroresponsive control relay is initially energized by the closure of a condition responsive master switch sufficiently to pick up and initiate the establishment of a prerequisite condition. At the same time a thermal lockout timer, having an electric heater connected in the relay pick-up energizing circuit to be energized jointly with the relay, becomes active to effect operation, when the prerequisite condition is not established at the end of a predetermined heating period, of a relatively movable member of a combined timing and condition responsive resistor switching mechanism to reduce the energization of the relay below its dropout value and thereby electrically lock out the relay while maintaining the circuit for the timer heater sufficiently energized under the control of the master switch to continue the electrical lockout of the relay until the circuit is opened to reset the thermal timer.

In case the prerequisite condition is successfully established within the predetermined heating period of the thermal timer, a condition responsive operating element responsive to such establishment operates a complementary relatively movable member of the combined timing and condition responsive resistor switching mechanism to insert a current limiting resistance in the relay energizing circuit and thereby reduce the energization of the relay to a holding value that is less than the relay pick-up value but greater than the relay drop-out value. Hence, in case of a voltage failure, the relay will immediately drop out but the current limiting resistance will prevent sufficient energization of the relay to pick up in case the voltage returns before a cooling of the thermal timer and a resetting thereof to its initial position has occurred. Preferably, the connection of the relay holding resistance in the circuit also effects a reduction in the energization of the electrical heater for the thermal timer so as to maintain a sufficient heating action but reducing the maximum temperature acquired during continued energization.

Thus in the improved control system, the relay and the thermal timer heater are maintained jointly energized when the prerequisite condition is established during the predetermined heating period, but on lockout the relay energization is reduced below the drop-out value so that the timer heater is, in effect, separately energized upon failure of the prerequisite condition to be established during the predetermined heating period. This enables the resetting of the thermal relay to be accomplished by opening the circuit that is under the control of the master switch since the electrical lockout of the control relay is accomplished without opening the energizing circuit initially closed by the master switch.

Further objects and advantages of the present invention will appear in the following description of the accompanying drawing in which Fig. 1 is a schematic circuit diagram illustrating one embodiment of the improved time and condition responsive interlocking control system applied to the control of an electrically operated oil burner; Fig. 2 is a schematic circuit diagram of a modified form of oil burner time and condition responsive interlocking control provided with a plurality of resistors for more effectively varying the heating of the thermal timer and the energization of the control relay; and Figs. 3, 4, 5 and 6 illustrate respectively the various positions of the relatively movable complementary circuit controlling members of the resistor switching mechanism during the different phases of lockout timing, transition, running and lockout operation of the modified system of Fig. 2.

As shown in Fig. 1, the improved system is applied to control the operation of the oil burner 10 which may be of any conventional type. As schematically shown, the burner 10 is operated by a driving motor 11 provided with a running winding 12, a cooperating starting winding 13, and also has an ignition transformer 15 for producing an ignition arc across the electrode 16 to ignite the combustible mixture of oil and air that is projected from the nozzle 17 of the burner when the driving motor 11 and the oil flow control valve 18 are energized to establish combustion.

A conventional form of motor accelerating relay 20 is provided for controlling the energization of the motor starting winding 13 and also is connected to control the oil valve 18. The starting winding 13 is energized and the oil valve 18 is short-circuited when the accelerating relay contact 21 is closed. The oil valve 18 becomes energized when the accelerating relay contact 21 is subsequently opened.

The operation of the oil burner 10 to produce and maintain combustion is under the control of the electromagnetic switch or relay 23. Relay 23, as shown, has the contact 24 biased to the circuit opening position but is effective upon sufficient energization of the operating winding thereof to pick up and close contact 24 and thereby complete the main oil burner energizing circuit from the supply lines L1, L2, through the conductors 25 and 26, preferably with the safety limit switches 27 and 28 responsive to excess pressure or excess temperature of the heating furnace or boiler that is fired upon operation of the burner 10.

The energization of the burner control relay 23 from the low voltage secondary of the transformer 30 is under the joint control of the masterswitch 31 and the improved combined thermal timing and condition responsive resistor switching mechanism 32. As indicated schematically, this mechanism is provided with a thermal timer operating element 33 which may be, as shown, in the form of a bimetal element fixed at its right-hand end and carrying a movable switch contact 34, and also an armature 35 for the snap action permanent magnet 36 at its left-hand free end. An electric heater 37 for heating thermal element 33 is shown connected in the relay energizing circuit controlled by the master switch 31. A current limiting resistor 38 for reducing the energization of both the heater 37 and the relay 23 is connected to be controlled by the multi-circuit switching mechanism 32 in the manner described more fully hereinafter.

The switching mechanism 32 is provided with a complementary relatively movable switch member comprising a resilient spring member 40 fixed at its right-hand end and carrying at its forked left-hand end the switching contacts 41 and 42. The spring member 40 also carries an auxiliary relatively movable switch arm 43 pivotally mounted in a supporting bracket 44 formed of electrical insulating material and provided with a contact 45 for engaging with contact 34 and a contact 46 for engaging with contact 42. The spring member 40 is biased to move the forked left-hand end thereof upwardly and thereby bias the contacts 42, 46 and 45, 34 into engagement as long as the thermal timing element 33 is in its relatively cool position in which it is shown in the drawing. In this position, the lockout contact 41 is maintained out of circuit closing engagement with the stationary contact 47.

A condition responsive operating element 50, responsive to the presence and absence of combustion at the burner nozzle 17 is provided for directly operating the auxiliary contact arm 43 to provide a timed combustion responsive selective lockout and holding control for the energizing circuit of the burner control relay 23. In the form shown, the combustion responsive operating element 50 is of the type having an expansible tube 51 and a non-expansible rod 52 subject to the heat developed in the combustion zone adjacent the end of the burner nozzle 17 for operating the pivoted arm 53 about the pivot axis 53a against the bias of the spring 54 to move the forked arm 55 into engagement with the stop 56 in the absence of combustion and into engagement with the stop 57 in response to the establishment of combustion. As shown, the forked arm 55 straddles the end of the auxiliary switch member 43 so as to operatively engage therewith upon the establishment of combustion.

Operation of Fig. 1

With the thermal timing element 33 and the combustion responsive operating element 50 in their respective cool positions, as shown in Fig. 1, the initiation of operation of the oil burner 10 is under the control of the master switch 31. This master switch 31 may be operated in response to a predetermined condition that is to be regulated by starting and stopping operation of the burner 10 such, for example, as room temperature, boiler water temperature, or boiler pressure. When the master switch 31 closes its contacts, an energizing circuit is established to pick up the control relay 23, this circuit extending from the secondary of transformer 30 through conductor 60, master switch 31, conductor 61, heater 37, and thence through the thermal operating element 33, the engaging contacts 34, 45, auxiliary switch arm 43, conductor 62, the operating winding of relay 23, conductors 63 and 64.

The thermal timer heater 37 is connected directly in the energizing circuit of the control relay 23 that is established upon closure of the master switch 31 so as to be energized jointly therewith. However, the current limiting resistor 38 is effectively short-circuited as long as contacts 34, 45 and 46, 42 remain in engagement. Hence, the current flowing in the relay circuit is of sufficient value to provide a pick-up energization of relay 23 and, at the same time, a heating energization of heater 37. As a result, relay 23 closes its contact 24 thereby completing an energizing circuit for the running winding 12 of the burner motor extending from supply line L1, through safety limit switches 27, 28, conductor 25, relay contact 24, conductor 66, the operating winding of accelerating relay 20, conductor 67, the motor running winding 12 and conductor 26 to supply line L2. The resulting inrush current causes the accelerating relay immediately to close its contact 21, thereby energizing the motor starting winding 11 in parallel with the running winding 12 through conductor 68, and at the same time short-circuiting the oil valve 18 so as to prevent effective energization thereof.

As soon as motor 10 has accelerated and the inrush current has decreased the energization of relay 20, contact 21 returns to the open position thereby connecting the operating winding of the oil valve 18 to be effectively energized by the voltage induced in the motor starting winding 13, the circuit extending from the left-hand terminal of the starting winding 13 through the winding of oil valve 18, winding of series relay 20, conductor 67, running winding 12 of the motor, to the other terminal of the starting winding 13. Since the motor starting winding 13 is inductively interlinked with the motor running winding 12, the voltage of both is effective for energizing the winding of the oil valve 18. This opens the oil valve and admits oil to the atomizing nozzle 17. Consequently, combustion should be established since the ignition transformer 15 was energized simultaneously with the winding 12. However, due to the cold condition of the burner combustion chamber or other factors, combustion may not become established effectively until after a limited period of operation of the burner 10 and under some abnormal conditions may not become established even then.

The heating of the thermal timing operating element 33 that was initiated simultaneously with the pick-up energization of control relay 23 continues to gradually raise the temperature of the thermal element 33 and, after a predetermined period of heating which corresponds substantially to the maximum safe operating period of the burner 10 without successful establishment of combustion, will result in the element 33 reducing the force exerted thereby against the bias of spring 40, and also the force with which the auxiliary switch arm 43 is held against the lower forked arm 55a, until finally the attractive force exerted by the permanent magnet 36 on armature 35 becomes predominant to produce a snap action operation of the thermal element 33 to carry switch contact 34 out of engagement with contact 45. As a result, the unopposed bias of the spring arm 40 will carry the lockout contact 41 into engagement with the cooperating stationary contact 47. This effects a low resistance short circuit of the operating winding of control relay 23, this short circuit extending through conductors 62 and 63 and through contacts 41, 47 and 42, 46. In this way the energization of relay 23 is reduced below the drop-out value and thereby the relay 23 becomes electrically locked out from control by the master switch and causes the relay contact 24 to open and stop further operation of the oil burner 10 even though the circuit controlled by the master switch 31 remains closed.

At the same time relay 23 is electrically locked out, the short circuit around the current limiting resistor 38 is removed upon the separation of the switch contacts 34 and 45 so that the current through the timer heater 37 becomes limited to a safe value to continue the heating of the thermal element 33 as long as the master switch 31 remains closed.

Thus, the improved interlocking control system is such that whenever operation of the oil burner 10 during the predetermined heating period of the thermal timing element 33 fails to successfully establish combustion, the control relay 23 is electrically locked out by the thermal timing operation of the combined timing and condition responsive switch mechanism 32 and the thermal timing operating element 33 is maintained heated after this period. After such a lockout, the thermal lockout timer may be reset simply by opening the master switch 31 to deenergize heater 37 for a sufficient time to permit the thermal element 33 to cool and release armature 35 from magnet 36 and thereby return the various parts of the lockout switching mechanism 32 to their respective positions in which they are shown in Fig. 1. Thereupon, a reclosure of the master switch 31 will result in restarting operation of the oil burner 10 in the same manner as described above.

If combustion should be successfully established during the heating period of the thermal element 33, the tube 51 will expand thereby enabling spring 54 to move the pivoted arm 53 and carry the forked arm 55 to engage the upper fork 55b thereof with the auxiliary switch arm 43. This will effectively prevent the bias of spring 40 from becoming effective to close the short-circuiting contacts 41 and 47 to lock out the relay. As a result, when contacts 34 and 45 are separated at the end of the heating period by the snap action movement of the thermal element 33, the current limiting resistance 38 will be inserted directly in the energizing circuit for both the relay 23 and the heater 37 as previously traced when the master switch 31 closes its contacts. This will reduce the energization of relay 23 below the pick-up value, but not below the drop-out value, so that the relay 23 will continue to hold its contact 24 closed and thus continue operation of the oil burner 10. When the continued operation of burner 10 has varied the condition to which the master switch 31 is responsive so as to cause this switch to open its contacts, then both relay 23 and heater 37 will be deenergized thereby and the operation of the burner 10 and the heating of the thermal element 33 stopped. Under these conditions, all of the control parts will, after the cooling of both thermal timer 33 and the combustion responsive device 50, return to their initial positions in which they are shown in Fig. 1.

If, during such continued operation of the burner 10, the power supply of the electric supply lines L1, L2 should fail, then both relay 23 and heater 37 will become deenergized. If power should return before thermal element 33 has cooled sufficiently to predominate over the attractive force exerted by the permanent magnet 36, the relay 23 will not be able to pick up due to the reduced energization thereof effected by the limiting resistor 38. This insures against a false lockout due to partial heating of the thermal timer since the timer element 33 always must be cool before the burner can operate.

The auxiliary switch arm 43 is provided for the purpose of insuring against mechanical failure of the combustion responsive operating element 50. Thus, should the rod 52 break or the tube 50 disintegrate under the continued corrosive action of combustion, the spring 54 will become effective to move the arms 53 and 55 downwardly sufficiently to engage stop 57 and thereby produce an upward movement of the forked arm 55 thereof to lift auxiliary arm 43 and allow the bias of spring 40 to close the lockout contacts 41, 47. This will short-circuit the relay 23 and prevent subsequent operation of the oil burner 10 until the combustion responsive device 50 is repaired. Furthermore, failure by burning out of either the timer heater 37 or the current limiting resistor 38 will always prevent effective energization of relay 23.

In the modified form of the invention shown in Fig. 2, the pivoted arm 55 of the combustion responsive device 50 directly carries the movable contacts 71 and 72 of the resistor sequence switching mechanism so as to operate contact 71 into engagement with the contact 34a carried by the thermal timing element 33 in the absence of combustion and to carry contact 72 into engagement with the cooperating stationary contact 73 when combustion is successfully established. Also, a heater 74 is provided for the thermal element 33, in addition to the heater 37a, in order more effectively to control the heating of this element. The other parts and connections of the control system are substantially the same as shown in Fig. 1, except that the thermal element 33 is in circuit closing engagement when cool with the stationary contact 77 for short-circuiting the current limiting resistor 38.

*Operation of Fig. 2*

With the modified control system of Fig. 2, when the master switch 31 closes its contacts, an energizing circuit for the relay 23 is established from the secondary of transformer 39 through conductor 60, master switch 31, the timer heaters 37a and 74 connected in parallel circuit due to the engagement of contact 71 with contact 34a, and thence through element 33, contact 77, conductor 75, the operating winding of relay 23, and thence to the other side of the secondary of transformer 39. With the current limiting resistor 38 short-circuited through contact 77, the relay 23 is energized above its pick-up value and the two heaters 37a and 74 are energized in parallel to produce the required heating of the thermal timing element 33. The resulting closure of the control relay contact 24 starts operation of the burner 10 in exactly the same manner as previously described to attempt to establish combustion during the predetermined heating period of the thermal timing element 33.

In case combustion is not successfully established during the timer heating period, the temperature of element 33 will gradually increase thereby reducing the force with which the free end of element 33 engages with contact 77 until the opposing biasing force of permanent magnet 36 on armature 35 becomes sufficient to effect a snap action of thermal element 33 to disengage contact 77 and, at the same time, disengage contact 34a from contact 71. As a result, relay 23 will become locked out since, as shown in Fig. 6, the relay winding 23 will be connected through the current limiting resistor 38, the thermal element 33, the heater 37a, and the master switch 31, all in series circuit. In this case, the current limiting action of resistor 38 in series with the single heater 37a is sufficient to reduce the energization of the relay 23 below the drop-out value. Consequently, the relay contact 24 opens to prevent further operation of the burner 10 as long as the thermal element 33 remains heated.

To reset the thermal timing lockout element 33, all that is necessary is to open the master switch 31 for a sufficient time to allow the element 33 to cool sufficiently to break away from magnet 36 and return to its initial position.

In case combustion is successfully established during the limited heating period of the thermal timing element 33 by operation of the burner 10, then the combustion responsive device 50 will operate arms 53 and 55 to carry contact 71 out of engagement with the cooperating contact 34a, as indicated in Fig. 3. This will temporarily leave only heater 37a in the energizing circuit of the relay 23 and, as a result, the current flowing through the relay 23 will become reduced below the pick-up energization value, but not below the drop-out value. Consequently, in case of a voltage failure while neither contacts 71 nor 72 are engaged, relay 23 cannot be reenergized until after the combustion responsive device 50 has cooled sufficiently to return contact 71 into engagement with contact 34a.

However, let us assume that combustion continues successfully established and voltage also continues during the predetermined heating period, and that the combustion responsive device 50 carries contact 72 into engagement with contact 73 before the end of the period. This establishes a transition resistor connection, as shown in Fig. 4, with the heater resistor 74 connected directly to the relay 23 through the contacts 72, 73, and independent of the circuit through contact 77 controlled by the thermal element 33. Thus when the snap action operation of the bimetal element 33 occurs due to the permanent magnet 36, as shown in Fig. 5, the heater resistor 37a becomes connected in series with the current limiting resistor 38 and the heater resistor 74 becomes connected in shunt with both. This interconnection of the resistors maintains the energization of relay 23 below the pick-up value but above the drop-out value so that voltage failure protection is obtained. Also, the initial rate of heating of the thermal element 33 is reduced to a value that can be continued as long as the master switch 31 remains closed to operate burner 10 to regulate the condition to which the master switch 31 is responsive. Upon opening of the master switch, the relay 33 and also both heaters 78 and 37a are deenergized and, after cooling of thermal element 33 and combustion responsive device 50, all the parts returned to their initial positions shown in Fig. 2.

In the modified control system of Fig. 2, a mechanical failure of flame responsive device 50 will permit the spring 54 to operate the arms 53 and 55 sufficiently to engage stop 57 and thereby force the thermal element 33 out of engagement with the contact 77. This inserts the current limiting resistor 38 in the circuit and thereby reduces the energization of relay 23 below the drop-out value. Likewise, in this modified system failure by burning out of any of the heaters or control resistors, or mechanical failure of the thermal element, will result in the system failing safe and preventing effective operation of the burner.

What I claim as new and desire to secure by Letters Patent of the United States is:

1. A control system having, in combination, an electroresponsive main control device having an energizing circuit, a thermal timer having electrical heating means connected in said circuit to be energized upon energization of said device, variable sequence multi-circuit switching mechanism operable by said timer and provided with both lockout circuit connections for deenergizing said device at the end of a predetermined heating period and maintaining circuit connections for maintaining said heating means effectively energized to maintain said lockout connections effective thereafter, and condition responsive means for varying said switching mechanism to render said lockout connections ineffective and said maintaining circuit connections effective to maintain said device and said heating means jointly energized after said period upon the occurrence of a predetermined condition during said period.

2. A control system having, in combination, an electroresponsive main control device, thermal timing switching means having a heater connected to be energized in series circuit with said device and having multi-circuit controlling relatively movable switch members provided with magnetic means for effecting a snap action relative movement thereof at the end of a predetermined heating period, multiple electric circuit connections controlled by said switch members for separately deenergizing said device at the end of said predetermined heating period while maintaining said heating means effectively energized to maintain said device deenergized thereafter, and condition responsive means for jointly controlling the relative movement of said switch members to render said deenergizing circuit connections ineffective and maintain said device and said heating means jointly energized in series circuit after said period upon the occurrence of a predetermined condition during said period.

3. A control system having, in combination, an electroresponsive main control device, a circuit including a master control switch for energizing said device, a thermal timing operating element having heating means connected to be energized upon closure of said circuit and provided with means for effecting snap action movement of said element at the end of predetermined heating and cooling periods, a multiple selective circuit controlling switch operable by said timing element and provided with both electrical lockout circuit connections for deenergizing said device at the end of a predetermined heating period and connections for maintaining said heating means effectively energized thereafter to lock out said device from direct control of said master switch, and condition responsive means for jointly controlling the operation of said selective switch to render said lockout circuit connections ineffective and maintain said device and said heating means jointly energized under the control of said master switch after said period upon the occurrence of a predetermined condition during said period.

4. A control system having, in combination, an electroresponsive main control device, a thermal timer having heating means connected to be energized in series circuit with said device and having variable sequence multi-circuit switching mechanism operable thereby and provided with both lockout circuit connections for separately deenergizing said device at the end of a predetermined heating period and connections for maintaining said heating means effectively energized thereafter to maintain said lockout connections effective, condition responsive means for varying said switching mechanism to render said lockout connections ineffective and maintain said device and said heating means jointly energized in series circuit after said period upon the occurrence of a predetermined condition during said period, and resistor means in said series circuit controlled by said variable switching mechanism for reducing the energization of said device and said heating means during said joint energization thereof after said period.

5. A control system having, in combination, an electroresponsive main control device, a combined thermal timing and selective condition responsive variable sequence multi-circuit switching means having electric heating means connected to be energized upon energization of said device and having snap action thermal operating means and both lockout circuit connections for deenergizing said device at the end of a predetermined heating period and circuit connections for maintaining said heating means energized to maintain said lockout circuit connections effective thereafter and provided with condition responsive selective operating means for maintaining said device and said heating means jointly energized after said period upon the occurrence of a predetermined condition during said period, and electrical means controlled by said switching means for reducing the energization of said device and said heating means during continued joint energization thereof after said period.

6. A control system having, in combination, a master switch, an electroresponsive main control device having an energizing circuit closed upon closure of said master switch, and means for independently controlling the energization of said electroresponsive device including a selective sequence switching mechanism having a stationary circuit controlling contact and a pair of relatively movable complementary circuit controlling members, a thermal operating element for one of said members having a heater in said energizing circuit, a condition responsive operating element responsive to a predetermined condition under the control of said device for controlling a complementary one of said members to effect a lockout deenergization of said electroresponsive device upon failure of said predetermined condition to occur within a predetermined period determined by the heating of said thermal operating element after the closure of said master switch and thereafter maintaining said heater energized to continue the heating of said thermal operating element until said circuit controlled by said master switch is opened.

7. A control system having, in combination, a master switch, an electroresponsive device connected to be energized upon closure of said master switch, a snap action thermal timer having electrical heating means connected to be energized in series circuit with said device, a selective multi-circuit controlling switching means operable by said timer and having both lockout circuit connections for deenergizing said device at the end of a predetermined heating period and circuit connections for maintaining said heating means effectively energized under control of said master switch thereafter to maintain said lockout circuit connections effective, condition responsive means for operating said selective switching means to render said lockout circuit connections ineffective and maintain said device and said heating means jointly energized under control of said master switch after said period upon the occurrence of a predetermined condition during said period, and a current limiting resistor having a short circuit therefor opened by said switching means at the end of said period for reducing the energization of said device and said heating means during said joint energization thereof after said period.

8. A control system having, in combination, a main electromagnetic control switch having different pick-up, holding and drop-out energizations, condition responsive means for effecting pick-up energization of said electromagnetic switch, a thermal timer having electrical heating means connected in series in the energizing circuit of said electromagnetic switch to be energized upon said pick-up energization thereof, means controlled by said timer for reducing the energization of said device below the drop-out energization value thereof at the end of a limited heating period while maintaining said heating means effectively energized at a reduced current value thereafter to maintain said timer controlled means effective, and a condition responsive device having means for maintaining said electromagnetic switch energized at a holding current energization jointly with said heating means after said period upon the occurrence of a predetermined condition during said period.

9. A control system having, in combination, a master switch, means including an electroresponsive device for controlling a predetermined condition, an energizing circuit for said device closed and opened under the control of said master switch, an electric heater connected in series in said circuit to be energized jointly with said device, thermal timing switching means disposed in heating relation with said heater and provided with means for effecting snap action movement thereof at the end of predetermined heating and cooling periods, connections controlled by said switching means for separately deenergizing said device at the end of said predetermined heating period while maintaining said heater effectively energized thereafter under the control of said master switch, condition responsive means effective upon the occurrence of said predetermined condition during said period for operating said switching means to maintain said device and heater jointly energized under control of said master switch thereafter, and current limiting means controlled by said switching means for limiting the current in said circuit upon said joint energization of said device and heater after said period.

10. A control system having, in combination, a master switch, means including an electroresponsive device for controlling a predetermined condition, an energizing circuit for said device closed and opened under the control of said master switch, an electric heater connected in series in said circuit to be energized jointly with said device, a combined thermal timing and selective condition responsive switching means for selectively controlling the energization of said device and heater and having a thermal timing element disposed in heating relation with said heater and provided with snap action operating means for operating said switching means to deenergize said device at the end of a predetermined heating period and maintain said heater effectively energized thereafter under the control of said master switch, and having a condition responsive selective element effective upon the occurrence of said predetermined condition during said period for operating said switching means to maintain said device and heater jointly energized under control of said master switch thereafter, and a current limiting resistor having a short circuit therefor opened by said switching means for reducing the energization of said device and said heater during said joint energization thereof after said period.

11. A control system having in combination a master switch, an electroresponsive condition control device having an energizing circuit under the control of said master switch and having a plurality of resistors interconnected therewith for controlling the energization of said device independently of said master switch, and a resistor switching mechanism having a plurality of relatively movable circuit controlling contacts, and a thermal timing operating element having a mechanical operating connection with one portion of said contacts and disposed in heating relation with at least one of said resistors, a condition responsive operating element responsive to a predetermined condition under the control of said electroresponsive device and having a mechanical operating connection with another portion of said relatively movable circuit controlling contacts, said contacts having electrical connection with said resistors for switching said resistors to effect the denergization of said electroresponsive device upon failure of said predetermined condition to occur within a predetermined period determined by the heating of said thermal timing operating element after the closure of said master switch and thereafter maintaining at least said one of said resistors energized to continue the heating of said thermal timing device until the circuit controlled by said master switch is opened and for effecting only a holding energization of said electroresponsive device when said predetermined condition occurs within said predetermined period to prevent reenergization of said electroresponsive device after a voltage failure until said thermal timing operating element has cooled.

12. A control system having an electroresponsive control device for controlling a predetermined condition and an electric heater in a series energizing circuit for said device and having normally closed thermal switching means therein opened by said heater at the end of a limited heating period after said circuit is energized, a current limiting shunt interconnected with said switching means for preventing both deenergization of said heater and effective energization of said control device upon said opening of said switching means, and a condition responsive device having means for maintaining said control device effectively energized after said opening of said switching means in response to the establishment of said predetermined condition under control of said control device during said period.

13. In a control system employing an electroresponsive control device and an electric heater in a series energizing circuit having normally closed thermal switching means therein opened by said heater at the end of a limited heating period, a plurality of current regulating shunts interconnected with said switching means for varying the relative energizations of said control device and heater upon opening of said switching means.

14. In a control system employing an electroresponsive control device and an electric heater in a series energizing circuit having normally closed thermal switching means therein opened by said heater at the end of a limited heating period, a current limiting shunt interconnected with said switching means for preventing both deenergization of said heater and effective energization of said control device upon said opening of said switching means, and means for shunting said shunt to maintain both said heater and said control device effectively energized upon said opening of said switching means.

JOHN EATON.